United States Patent [19]

Chen et al.

[11] Patent Number: 5,916,991

[45] Date of Patent: *Jun. 29, 1999

[54] COMPOSITION AND METHOD FOR WATER CLARIFICATION

[75] Inventors: Jen-Chi Chen, Morrisville; Fu Chen, Newtown; Gerald C. Walterick, Jr., Levittown, all of Pa.

[73] Assignee: BetzDearborn Inc., Trevose, Pa.

[ * ] Notice: This patent is subject to a terminal disclaimer.

[21] Appl. No.: 08/889,855

[22] Filed: Jul. 8, 1997

Related U.S. Application Data

[63] Continuation-in-part of application No. 08/246,547, May 20, 1994, Pat. No. 5,684,109, which is a continuation-in-part of application No. 08/080,909, Jun. 22, 1993, abandoned.

[51] Int. Cl.$^6$ ....................................................... C08H 5/02
[52] U.S. Cl. .......................... 527/400; 524/735; 524/799; 526/238.2; 526/238.3
[58] Field of Search ............................... 527/400; 524/72, 524/73, 735, 74, 799; 526/238.2, 238.3

[56] References Cited

U.S. PATENT DOCUMENTS

| | | | |
|---|---|---|---|
| 2,590,760 | 3/1952 | DaVeigg | 524/799 X |
| 3,864,291 | 2/1975 | Enkvist | 524/799 |
| 3,932,488 | 1/1976 | Sears et al. | 260/473.5 |
| 4,090,919 | 5/1978 | Chibata et al. | 195/63 |
| 4,246,124 | 1/1981 | Swanson | 524/72 X |
| 4,558,080 | 12/1985 | Quamme et al. | 524/72 |
| 4,579,927 | 4/1986 | Patel et al. | 527/400 |
| 4,734,216 | 3/1988 | Kelly et al. | 252/101 |
| 4,743,633 | 5/1988 | Navratil et al. | 524/799 X |
| 4,781,839 | 11/1988 | Kelly et al. | 210/725 |
| 4,858,693 | 8/1989 | Navratil et al. | 527/400 X |
| 4,990,270 | 2/1991 | Meister | 252/8.554 |
| 5,134,215 | 7/1992 | Huddleston et al. | 527/400 |
| 5,147,964 | 9/1992 | Huddleston et al. | 527/400 |
| 5,152,403 | 10/1992 | Patel | 210/699 |
| 5,256,304 | 10/1993 | Meyer et al. | 210/730 X |

FOREIGN PATENT DOCUMENTS

| | | |
|---|---|---|
| 3123999 | 1/1983 | Germany . |
| 5752537 | 1/1976 | Japan . |
| 5929200 | 1/1976 | Japan . |
| KO 1224004 | 3/1988 | Japan . |
| KO 1228541 | 3/1988 | Japan . |
| KO 3161411 | 11/1989 | Japan . |
| KO 4222697 | 3/1991 | Japan . |

*Primary Examiner*—Judy M. Reddick
*Attorney, Agent, or Firm*—Philip H. Von Neida

[57] ABSTRACT

Tannin containing polymers, their method of production and methods of using as water treatment agents are disclosed. The tannin containing polymers comprise copolymers of tannin and a cationic monomer. Another embodiment comprises tannin containing polymers of tannin, cationic monomer and at least one monomer selected from the group consisting of an anionic monomer and a nonionic monomer.

7 Claims, No Drawings

COMPOSITION AND METHOD FOR WATER CLARIFICATION

This is a continuation of Ser. No. 08/246,547, filed May 20, 1994 now U.S. Pat. No. 5,684,109 which is a continuation-in-part of Ser. No. 08/080,909 filed Jun. 22, 1993, now abandoned.

FIELD OF THE INVENTION

The present invention relates to compositions of tannin containing polymers and methods of using the same for water clarification.

BACKGROUND OF THE INVENTION

Raw water such as water from rivers, lakes or underground usually contains suspended matter. The suspended matter must be removed by clarification in order to provide water suitable for use in domestic and industrial applications. The suspended matter can consist of large solids, settleable by gravity alone without any external aid, and nonsettleable material, often colloidal in nature. Removal of the suspended material is generally accomplished by coagulation, flocculation, and sedimentation. in combination, these processes are referred to as conventional clarification. (see Betz Handbook of Industrial Water Conditioning, 9th Edition, 1991, Betz Laboratories, Inc., Trevose, Pa., pages 23 through 30).

Naturally occurring suspended particles are predominantly negatively charged. Water-soluble organic cationic polymers, such as polyamine and polydiallyidimethyl ammonium chloride, are normally used to clarify water having high turbidity (greater than 60 NTU, nephelometric turbidity units). In low turbidity water (less than 60 NTU), there are generally not enough particulates to form a settleable floc when the water is treated with cationic polymer alone. Inorganic coagulants such as aluminum sulfate, polyaluminum chloride, ferric sulfate, ferric chloride and sodium aluminate are used instead. These inorganic coagulants are relatively inexpensive and generally effective for water clarification. However, they tend to generate voluminous sludge which is difficult to dewater. Also, such inorganic coagulants are only effective within a particular pH range and therefore require proper pH adjustment of the water during treatment. In addition, residual iron and aluminum ions in the water treated may affect downstream operations such as cooling and boiler treatments and may also cause health and environmental concerns when the water is finally discharged.

Water soluble/dispersible melamine formaldehyde resins have been used for clarification of low turbidity waters, but the residual formaldehyde in the resin can give rise to handling and disposal difficulties. It is the object of the present invention to provide an effective method of clarifying water without incurring the disadvantages of inorganic coagulants and melamine formaldehyde resins.

SUMMARY OF THE INVENTION

The present invention provides for a composition, the method of preparing the same and a method of using the composition for water clarification. The composition comprises a water soluble/dispersible tannin containing polymer obtained by polymerizing ethylenically unsaturated monomers with tannin.

DESCRIPTION OF THE RELATED ART

U.S. Pat. Nos. 4,558,080; 4,734,216 and 4,781,839 disclose a tannin based polymer obtained by reacting tannin with an amino compound and an aldehyde under acidic conditions for use as a flocculant. The manufacturing process requires careful monitoring of the pH and intermediate viscosity during the reaction to prevent the batch from gelling. The long term stability of the product and the amount of residual amine and formaldehyde in the solution may cause handling concerns.

U.S. Pat. No. 4,990,270 discloses a thickening agent prepared by graft copolymerizing acrylamide and cationic monomer with water insoluble lignin in a calcium chloride/dimethylsulfoxide solution. The procedure is quite complicated and requires precipitation in acetone and filtration, and dialysis to isolate the product. The resulting material is used for enhanced oil recovery.

DETAILED DESCRIPTION OF THE INVENTION

This invention provides for a composition comprising a tannin containing polymeric material. The invention also provides for methods for preparing the tannin containing polymers and methods of using the polymers for various water treatments.

Tannin, also called tannic acid, occurs in the leaf, branch, bark and fruit of many plants. As disclosed by A. Pizzi in "Condensed Tannin for Adhesives", Ind. Eng. Chem. Prod. Res. Dev. 1982, 21, pages 359–369, the natural tannins can be as "hydrolyzable" tannin and "condensed" tannin. The composition and structure of tannin will vary with the source and the method of extraction, but the empirical structure is given as $C_{76}H_{52}O_{46}$ with many OH groups attached to the aromatic rings. The tannin used in the present invention is a condensed tannin type including but not limited to those derived from Quebracho, Mimosa and Sumac. However, hydrolyzable tannins are also contemplated to be within the scope of this invention.

The present invention relates to a water soluble or dispersible tannin containing polymer composition comprising a copolymer of a tannin and a cationic monomer. In another embodiment of the present invention, the water soluble or dispersible tannin containing polymer composition comprises a polymer of tannin; a cationic monomer and at least one monomer selected from the group consisting of an anionic monomer and a nonionic monomer.

The cationic monomer is selected from a group containing ethylenically unsaturated quaternary ammonium, phosphonium or sulfonium ions. Typical cationic monomers are quaternary ammonium salts of dialkylaminoalkyl(meth)acrylamides, dialkylaminoalkyl(meth)acrylates and diallyl dialkyl ammonium chloride.

The preferred cationic monomers are selected from the group include but are not limited to methyl chloride quaternary salt of diethylaminoethyl acrylate, dimethyl sulfate salt of diethylaminoethyl acrylate, dimethylaminoethyl acrylate, dimethylaminoethyl methacrylate, diethylaminoethyl methacrylate, dimethylaminopropyl methacrylamide, dimethylaminopropyl acrylamide, diallyldimethyl ammonium chloride and diallyidiethyl ammonium chloride. The most preferred cationic monomer is methyl chloride quaternary salt of diethylaminoethyl acrylate.

The anionic monomer is selected from the group containing ethylenically unsaturated carboxylic acid or sulfonic acid functional groups. These monomers include but are not limited to acrylic acid, methacrylic acid, vinyl acetic acid, itaconic acid, maleic acid, allylacetic acid, styrene sulfonic acid, 2-acrylamido-2-methyl propane sulfonic acid (AMPS®) and 3-allyloxy-2-hydroxypropane sulfonic acids and salts thereof. The preferred anionic monomer is acrylic acid.

The nonionic monomer is selected from the group of ethylenically unsaturated nonionic monomers which comprise but are not limited to acrylamide, methacrylamide, N-methylolacrylamide, N,N-dimethyl-acrylamide; lower alkyl ($C_1$–$C_6$) esters including vinyl acetate, methyl acrylate, ethyl acrylate, and methyl methacrylate; hydroxylated lower alkyl ($C_1$–$C_6$) esters including hydroxyethyl acrylate, hydroxypropyl acrylate and hydroxyethyl methacrylate; allyl glycidyl ether; and ethoxylated allyl ethers of polyethylene glycol, polypropylene glycol and propoxylated acrylates. The preferred nonionic monomers are allyl glycidyl ether and acrylamide.

The resulting tannin containing polymer contains from 10 to 80% by weight of tannin, 20 to 90% by weight of cationic monomer, 0 to 30% by weight of nonionic monomer and 0 to 20% by weight of anionic monomer, provided that the resulting tannin containing polymer is still water soluble or dispersible and the total weight % of cationic, nonionic and anionic monomers and tannin adds up to 100%. Preferably, when the cationic monomer and anionic monomer are present together in the tannin containing polymer, the cationic monomer comprises a greater weight percentage than the anionic monomer.

The preferred copolymer of tannin and cationic monomer contains 20 to 80 weight % of tannin. More preferably, the copolymer contains from 30 to 60 weight % of tannin and most preferably, from 30 to 50 weight % of the tannin in the copolymer, provided the total weight of tannin and cationic monomer totals 100 weight %. More preferably still, the copolymers have a weight % of 30% tannin and 70% cationic monomer and 50% tannin and 50% cationic monomer. These particular copolymers are most preferred when the tannin is a Mimosa type tannin and the cationic monomer is methyl chloride quaternary salt of dimethylaminoethyl acrylate.

The number average molecular weight of the resulting tannin containing polymer is not critical, as it is still water soluble or dispersible. The tannin containing polymers may be prepared by mixing the desired monomers with tannin and initiating by a free radical initiator via solution, precipitation or emulsion polymerization techniques. Conventional initiators such as azo compounds, persulfates, peroxides and redox couples may be used. The preferred initiators are 2,2'azobis(2-amidinopropane) dihydrochloride, available as V-50 from Wako Chemicals and tbutylhydroperoxide/sodium metabisulfite (t-BHP/NaMBS). These or other initiators may be added at the end of polymerization to further react with any residual monomers.

Chain transfer agents such as alcohol, amine, formic acid or mercapto compounds may be used to regulate the molecular weight of the polymer. The resulting polymer may be isolated by well known techniques including precipitation, etc., or the polymer may simply be used in its aqueous solution.

The reaction temperature is not critical and generally occurs between 20° and 100° C., preferably 40° to 70° C. The pH of the reaction mixture is also not critical and is generally in the range of 2.0 to 8.0. The resulting tannin containing polymers are characterized by C-13 NMR, Brookfield viscosity and percent solids.

The resulting tannin containing polymers should be added to the aqueous system to be treated in an amount sufficient for its intended purpose. For the most part, this amount will vary depending upon the particular aqueous system for which treatment is desired and can be influenced by such variables as turbidity, pH, temperature, water quantity and type of contaminants present in the system. The tannin containing polymers are effective at a wide range of pHs and should prove effective at the pH of any aqueous system for which water treatment is sought.

The tannin containing polymers of the present invention prove useful in a variety of aqueous systems suffering from different contaminants but are well suited to the reduction of turbidity, color and the clarification of aqueous systems such as influent waters and waste water systems. Clay, silt, finely divided organic and inorganic matter, and microscopic organisms can all contribute to turbidity. Color is most often colloidal in nature and results from organic materials such as humic acids and other compounds leached from vegetative matter.

The tannin containing polymers can be added to the aqueous system where water clarification is sought in amounts ranging from about 0.1 parts to about 100 parts per million parts water. The polymers may be added to the aqueous system neat or in an aqueous solution either continuously or intermittently.

Polymeric flocculants such as polyacrylamide and copolymers of acrylamide with acrylic acid and other coagulants such as alum, ferric chloride, clays, zeolites, activated carbon and the like may be used in conjunction with the tannin containing polymers to reduce turbidity and color and improve clarity.

Those skilled in the art will recognize the many applications in which these tannin containing polymers will find utility. These utilities include, but are not limited to, wastewater treatment applications such as wastewater from chemical plants, refineries and pulp and paper mills, influent water clarification, color reduction, secondary water clarification, oily waste water treatment, proteinaceous containing waste water, papermaking (e.g., retention and drainage aids), protein recovery, emulsion breaking, sludge dewatering, upflow filter clarification, horizontal flow clarification, and the like.

In order to more clearly illustrate this invention, the data set forth below were developed. The following examples are included as illustrations of the invention and should not be construed as limiting the scope thereof.

EXAMPLES

Experimental procedures for the preparation of tannin containing polymers.

Example 1

A reaction flask equipped with a condenser, a thermometer, a nitrogen inlet and a mechanical stirrer was charged with 51.0 g of condensed tannin (Quebracho type) and 204.0 g of deionized water. 3.5 g of 50% caustic and 3.76 g of allylglycidyl ether (AGE) were then added to the tannin solution. This solution was heated to 50° C. and maintained for 7 hours. FT-IR showed that there were no adsorption bands corresponding to the residual epoxy group of AGE.

Example 2

The resulting tannin/AGE solution of Example 1 was adjusted to pH 6.8 by sulfuric acid. An initiator solution containing 0.39 g of 2,2' azo bis (2-amidino propane) dihydrochloride (V-50) in 2.4 g of deionized water was then added to 124 g of the solution at 60° C. A monomer solution containing 57.2 g of dimethylaminoethyl acrylate methyl chloride quat (AETAC, 80%) and 1.1 g of acrylic acid (AA) was then gradually added to the flask in 5 hours.

Additional initiator solution was added before the completion of the monomer addition. After that, the polymerization was allowed to proceed overnight. More initiator was added to complete the reaction. The structure of the resulting polymer was verified by C-13 NMR. The resulting tannin containing polymer solution had a Brookfield viscosity of 1070 cps at 27.3% solids (25C).

Example 3

Utilizing the apparatus and procedure as described in Example 2, 60.5 g of 80% AETAC and 1.2 g of AA were used for polymerization with 79 g of the tannin/AGE solution. The resulting tannin containing polymer solution had a Brookfield viscosity of 243 cps at 24.5% solids (25C).

Example 4

Utilizing the apparatus, procedure and reagent charge as described in Example 3, 32.50 g of the AGE/tannin solution was used for the polymerization with AETAC and AA. The resulting solution had a Brookfield viscosity of 81 cps at 21.8% solids (25C)

Example 5

The apparatus and procedure similar to that described in Example 3 were used, except this time, AA was not used for the reaction. The solution pH was adjusted to 6.5 by sulfuric acid before polymerization. 60.5 g of 80% AETAC and 79 g of the tannin/AGE solution were used for polymerization. The resulting polymer solution had a Brookfield viscosity of 1050 cps at 26.9% solids (25C).

Example 6 & 7

A procedure as described in Example 5 was used to prepare a different weight ratio of tannin/AETAC polymers. The composition and physical properties of the resulting polymer solutions are shown in Tables I and II.

Example 8

60.5 g of AETAC (80%) and 1.2 g of AA were gradually charged into 127.5 g of tannin solution (20% solids) at 60° C. in 4.5 hours. V-50 was shot fed into the reactor vessel to initiate the polymerization process The structure of the resulting tannin containing polymer solution was verified by C-13 NMR. The resulting polymer solution had a Brookfield viscosity of 583 cps at 35.5% solids (25C).

Example 9

A similar process as described in Example 8 was used to prepare a tannin/AETAC/AA polymer solution. The resulting polymer solution had a Brookfield viscosity of 754 cps at 35.6% solids (25C).

Example 10

A similar process as described in Example 8 was used to prepare a tannin/AETAC solution. 64.5 g of AETAC (80%) was reacted with 127.5 g of tannin solution (20% solids) using V-50 as the initiator. The resulting polymer solution had a Brookfield viscosity of 625 cps at 35.2% solids (25C).

Example 11

Utilizing a procedure similar to that described in Example 10, 47.8 g of 80% AETAC was reacted with 127.5 g of tannin solution (20% solids) using V-50 as the initiator. The structure of the resulting polymer was verified by C-13 NMR. The polymer solution had a Brookfield viscosity of 323 cps at 33.3% solids (25C).

Example 12

Utilizing an apparatus and procedure similar to that described in Example 11, Mimosa type of tannin was used in the reaction. The resulting solution had a Brookfield viscosity of 109 cps at 36.3% solids (25C).

Examples 13 and 14

Utilizing a similar apparatus and procedure as described in Example 11, Mimosa type of tannin from a different source was used in the reaction.

Example 15

In this example, a redox pair of t-butylhydroperoxide (t-BHP)/sodium metabisulfite (NaMBS) was used as the initiator. 22.1 g of tannin (Mimosa type), 64.5 g of 80% AETAC were charged to a reaction vessel containing 42.7 g of DI water at 55C. 20 g of 4% t-BHP and 20 g of 6% NaMBS were then gradually charged to the solution in 5.5 hours at 50–55° C. The solution was held at 50° C. for 30 minutes before cooling down. After final dilution, the resulting polymer solution had a Brookfield viscosity of 173 cps at 31.2% solids (25C).

Example 16

Utilizing a similar procedure as described in Example 15, Quebracho tannin was used in the reaction. The resulting solution had a Brookfield viscosity of 133 cps at 32.5% solids (25C).

Examples 17, 18, 19 and 20

A similar procedure as described in Example 15 was used to prepare a different weight ratio of tannin/AETAC polymer.

Example 21

Utilizing a procedure similar to that described in Example 15 however, 31.0 g of 80% AETAC and 7.7 g of 52% acrylamide (AM) were used to copolymerize with 38.7 g of tannin. The resulting solution had a Brookfield viscosity of 459 cps at 31.2% solids (25C).

Example 22

Utilizing a procedure similar to Example 15, 1439 parts of AETAC (80%) was reacted with 1151 parts of tannin (Mimosa type) in an aqueous solution at 45° C. 68 parts of t-BHP and 189 parts of sodium metabisulfite (20%) was used as the initiator. The resulting solution had a Brookfield viscosity of 1150 cps at 37.2% solids (25C).

Example 23

Utilizing a procedure similar to Example 22, 4400 parts of AETAC (80%) was reacted with 3520 parts of tannin (Mimosa type) in an aqueous solution. The resulting solution had a Brookfield viscosity of 409 cps at 38.2% solids (25C).

Comparative Example

A tannin/monoethanolamine/formaldehyde material was prepared in substantial conformity to the procedure of Example 1 in U.S. Pat. No. 4,558,080. The resulting product had a viscosity of 200 cps (40.5% solids) at pH of 2.4.

Tables I and II summarize the composition and physical properties of the resulting tannin containing polymers.

TABLE I

Composition of tannin containing polymers
Examples 1–11 and 15–21 are Quebracho tannin
Examples 12–14 and 22–23 are Mimosa tannin

| Example No. | Composition | Weight % |
|---|---|---|
| 2 | tannin/(AETAC/AA/AGE) | 33.1/(62.9/1.6/2.4) |
| 3 | tannin/(AETAC/AN/AGE) | 23.2/(73.3/1.8/1.7) |
| 4 | tannin/(AETAC/AA/AGE) | 11.1/(86.0/2.1/0.8) |
| 5 | tannin/(AETAC/AGE) | 32.2/(65.4/2.4) |
| 6 | tannin/(AETAC/AGE) | 22.5/(75.8/1.7) |
| 7 | tannin/(AETAC/AGE) | 10.8/(88.4/0.8) |
| 8 | tannin/(AETAC/AGE) | 34/(64.4/1.6) |
| 9 | tannin/(AETAC/AA | 34/(64.4/1.6) |
| 10 | tannin/AETAC | 33.1/66.9 |
| 11 | tannin/AETAC | 40/60 |
| 12 | tannin/AETAC | 33.1/66.9 |
| 13 | tannin/AETAC | 33.1/66.9 |
| 14 | tannin/AETAC | 33.1/66.9 |
| 15 | tannin/AETAC | 30/70 |
| 16 | tannin/AETAC | 30/70 |
| 17 | tannin/AETAC | 40/60 |
| 18 | tannin/AETAC | 50/50 |
| 19 | tannin/AETAC | 50/50 |
| 20 | tannin/AETAC | 55/45 |
| 21 | tannin/(AETAC/AM) | 50/(40/10) |
| 22 | tannin/AETAC | 50/50 |
| 23 | tannin/AETAC | 50/50 |

AETAC is dimethylaminoethyl acrylate methyl chloride QUAT
AA is acrylic acid
AGE is allyl glycidyl ether
AM is acrylamide

TABLE II

Physical properties
of tannin-containing polymers

| Examples | Composition | Solids % | pH | Brookfield Viscosity (cps) |
|---|---|---|---|---|
| 2 | tannin/(AETAC/AA/AGE) | 27.3 | 4.0 | 1070 |
| 3 | tannin/(AETAC/AA/AGE) | 24.5 | 3.5 | 243 |
| 4 | tannin/(AETAC/AA/AGE) | 21.8 | 3.1 | 81 |
| 5 | tannin/(AETAC/AGE) | 26.9 | 4.6 | 1050 |
| 6 | tannin/(AETAC/AGE) | 24.4 | 4.4 | 151 |
| 7 | tannin/(AETAC/AGE) | 21.8 | 4.0 | 89 |
| 8 | tannin/(AETAC/AGE) | 35.5 | 3.4 | 583 |
| 9 | tannin/(AETAC/AA) | 35.6 | 3.2 | 754 |
| 10 | tannin/AETAC | 35.2 | 4.0 | 625 |
| 11 | tannin/AETAC | 33.3 | 4.0 | 323 |
| 12 | tannin/AETAC | 36.3 | 3.6 | 109 |
| 13 | tannin/AETAC | 36.4 | 3.6 | 204 |
| 14 | tannin/AETAC | 36.3 | 3.5 | 238 |
| 15 | tannin/AETAC | 31.2 | 1.8 | 173 |
| 16 | tannin/AETAC | 32.5 | 2.2 | 133 |
| 17 | tannin/AETAC | 33.2 | 2.3 | 148 |
| 18 | tannin/AETAC | 31.8 | 2.4 | 118 |
| 19 | tannin/AETAC | 33.5 | 2.8 | 180 |
| 20 | tannin/AETAC | 32.1 | 2.2 | 189 |
| 21 | tannin/(AETAC/AM) | 31.2 | 2.4 | 459 |
| 22 | tannin/AETAC | 37.2 | 2.2 | 1150 |
| 23 | tannin/AETAC | 38.2 | 2.5 | 407 |
| Comparative: | | | | |
| | tannin/amine/formaldehyde | 40.5 | 2.4 | 200 |

AETAC = methyl chloride quaternary salt of dimethylaminoethyl acrylate
AA = acrylic acid
AGE = allyl glycidyl ether
AM = acrylamide
Comparative = polymer of U.S. Pat. No. 4,558,080, Example 1

Efficacy Tests

In order to demonstrate the efficacy of the tannin containing polymers of the invention for reducing turbidity and color, water clarification tests were conducted using the synthetic river water and water samples from various U.S. rivers as test substrates.

The synthetic river water substrate contained distilled water, reagent grade chemicals ($CaCO_3$ and $MgCO_3$) and naturally occurring clays and humic acid. It was prepared to have the following composition, which closely approximates the composition of a typical low-medium turbidity river water:

turbidity=8–10 NTU total suspended solids=30 mg/l true color=25 Pt-Co color units pH=7.0

Ca=40 ppm as CaCO3

Mg=20 ppm as CaCO3

Test Procedure

The procedure used was a standard jar test designed to simulate the operation of a typical water treatment clarifier. For single component treatments, the test procedure consisted of: adding the polymer treatment to the test substrate at various dosages, mixing the treated substrate and allowing the solids formed in the water to settle, and finally measuring the residual turbidity and color of the supernatant water produced by each treatment.

Analytical procedures used to evaluate product efficacies included turbidity measurement and true color measurement. Turbidities of untreated and treated water samples were determined using a Hach Model 18900 ratio turbidimeter. True color concentrations were determined by measuring the absorbance at 455 nanometers of samples that had been filtered through a 0.45 micron filter. Absorbances were measured using a Hach DR 2000 spectrophotometer calibrated to convert absorbance values to standard platinum-cobalt color units (Pt-Co cu).

For dual component treatments, the test procedure consisted of: adding the tannin containing polymer treatment to the test substrate, mixing 2 minutes, adding an anionic flocculant to the treated substrate, mixing 20 minutes, settling 15 minutes, and measuring the supernatant turbidity.

Tables III and IV show the lowest measured turbidity value for each polymer at the polymer dosage that achieved this turbidity.

Tables V and VI show the residual true color and residual turbidity results for the tannin containing polymers.

Commercial materials such as alum (aluminum sulfate), water soluble resins of melamine formaldehyde and tannin/amine/formaldehyde were also tested for comparison.

TABLE III

Turbidity testing for tannin containing polymers
Lowest turbidity (NTU) at ppm active dosage

| Treatment | Synthetic Water (8–10 NTU) | | Delaware River Water (4–7 NTU) | | Delaware River Water* | |
|---|---|---|---|---|---|---|
| | ppm | NTU | ppm | NTU | ppm | NTU |
| Example 2 | 1.0 | 0.9 | 2.0 | 2.3 | 2.0 | 1.5 |
| Example 3 | 1.0 | 1.5 | 0.5 | 2.7 | | |
| Example 4 | 0.5 | 2.1 | 0.5 | 2.8 | | |
| Example 5 | 1.0 | 0.5 | 0.5 | 2.5 | | |
| Example 6 | 1.5 | 1.2 | 0.5 | 2.6 | | |
| Example 7 | 0.5 | 2.5 | 0.5 | 2.6 | | |

TABLE III-continued

Turbidity testing for tannin containing polymers
Lowest turbidity (NTU) at ppm active dosage

| Treatment | Synthetic Water (8–10 NTU) | | Delaware River Water (4–7 NTU) | | Delaware River Water* | |
|---|---|---|---|---|---|---|
| | ppm | NTU | ppm | NTU | ppm | NTU |
| Example 8 | 1.0 | 0.8 | 2.0 | 1.8 | 2.0 | 1.5 |
| Example 9 | 0.75 | 0.7 | | | | |
| Example 10 | 0.75 | 0.7 | | | | |
| Example 11 | 1.5 | 0.3 | 2.0 | 2.8 | 2.0 | 1.6 |
| Example 12 | 1.5 | 0.6 | 2.0 | 2.0 | 2.0 | 1.2 |
| Example 13 | 1.5 | 0.6 | 2.0 | 1.5 | 2.0 | 1.1 |
| Example 14 | 1.0 | 0.8 | 2.0 | 1.6 | 2.0 | 1.0 |
| MF | 6.6 | 0.7 | 6.0 | 0.5 | | |
| Alum | 15.0 | 0.2 | 10.0 | 0.9 | | |
| Tannin/AM/F | 7.0 | 0.2 | 4.0 | 0.7 | | |
| Comparative | | | 6.0 | 0.7 | | |

*with 0.1 ppm of anionic (acrylamide/acrylic acid) (90/10) copolymer.
MF is a commercially available melamine/formaldehyde resin tannin/AM/F is a commercially available tannin/amine/formaldehyde polymer
Comparative is Example 1 of U.S. Pat. No. 4,558,080.

Comparative is Example 1 of U.S. Pat. No. 4,558,080.

TABLE IV

Turbidity testing for tannin containing polymers
Lowest turbidity (NTU) at ppm active dosage
7.2 NTU untreated river water turbidity

| Treatment | Delaware River Water | | Delaware River Water | | |
|---|---|---|---|---|---|
| | ppm | NTU | ppm | NTU | ppm/AM/AA* |
| Example 15 | 4.0 | 2.7 | 4.0 | 1.5 | 0.25 |
| Example 16 | 4.0 | 4.1 | 4.0 | 2.2 | 0.25 |
| Example 17 | 4.0 | 2.4 | 3.0 | 0.9 | 0.25 |
| Example 18 | 4.0 | 1.6 | 3.0 | 1.0 | 0.10 |
| Example 19 | 4.0 | 1.8 | 3.0 | 1.1 | 0.25 |
| Example 20 | 4.0 | 1.3 | 3.0 | 1.0 | 0.10 |
| Example 21 | 4.0 | 2.3 | 3.0 | 1.0 | 0.10 |
| MF | 8.0 | 0.8 | | | |
| Alum | 12.5 | 0.3 | | | |
| Tannin/AM/F | 6.0 | 0.8 | | | |

*ppm of 90/10 acrylamide/acrylic acid copolymer MF is commercially available melamine/formaldehyde resin
Tannin/AM/F is a commercially available tannin/amine/formaldehyde polymer

TABLE V

Turbidity and color reduction testing
Wisconsin River water substrate

| | Polymer | Supernatant Water Quality | |
|---|---|---|---|
| Example | Dosage (mg actives/liter) | Residual Turbidity (ntu) | Residual True Color (Pt-Co cu) |
| no treatment | 0 | 10.6 | 69 |
| Example 14 | 4 | 10.7 | 42 |
| Example 14 | 8 | 4.4 | 27 |
| Example 14 | 12 | 2.5 | 19 |
| Example 14 | 16 | 1.7 | 14 |
| Example 14 | 20 | 3.7 | 10 |
| Example 17 | 4 | 11.6 | 45 |
| Example 17 | 8 | 4.2 | 26 |
| Example 17 | 12 | 2.8 | 19 |
| Example 17 | 16 | 2.5 | 15 |
| Example 17 | 20 | 3.0 | 12 |
| Example 18 | 4 | 11.4 | 60 |
| Example 18 | 8 | 8.2 | 33 |
| Example 18 | 12 | 3.4 | 26 |
| Example 18 | 16 | 3.4 | 22 |
| Example 18 | 20 | 2.7 | 19 |
| Example 20 | 4 | 10.8 | 61 |
| Example 20 | 8 | 11.0 | 40 |
| Example 20 | 12 | 3.6 | 30 |
| Example 20 | 16 | 2.9 | 29 |
| Example 20 | 20 | 2.6 | 26 |
| Example 21 | 4 | 11.2 | 56 |
| Example 21 | 8 | 7.1 | 39 |
| Example 21 | 12 | 2.8 | 33 |
| Example 21 | 16 | 2.7 | 30 |
| Example 21 | 20 | 3.1 | 29 |
| tannin/AM/F | 12 | 9.4 | 47 |
| tannin/AM/F | 14 | 6.1 | 40 |
| tannin/AM/F | 16 | 2.7 | 35 |
| tannin/AM/F | 20 | 1.41 | 26 |
| tannin/AM/F | 24 | 1.08 | 22 | tannin/AM/F is a commercially available tannin/amine/formaldehyde polymer

TABLE VI

Color reduction testing
Hudson River water substrate

| | Polymer | Supernatant Water Quality | |
|---|---|---|---|
| Example | Dosage (mg actives/liter) | Residual Turbidity (ntu) | Residual True Color (Pt-Co cu) |
| no treatment | 0 | 16.7 | 22 |
| Example 22 | 3 | 9.4 | 13 |
| Example 22 | 6 | 3.1 | 12 |
| Example 22 | 9 | 1.55 | 11 |
| Example 22 | 12 | 0.98 | 8 |
| Example 22 | 15 | 1.13 | 7 |
| Example 23 | 3 | 10.8 | 15 |
| Example 23 | 6 | 3.2 | 10 |
| Example 23 | 9 | 1.52 | 10 |
| Example 23 | 12 | 1.50 | 10 |
| Example 23 | 15 | 0.98 | 10 |

The results in Tables IIII and IV demonstrate that the polymers of the invention reduced the turbidity in the test substrates at low dosage.

The results in Tables V and VI show that the tannin containing polymers of the present invention also prove effective at reducing color in influent water.

While this invention has been described with respect to particular embodiment thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A water soluble or dispersible polymer composition comprising a copolymer of a tannin and a cationic monomer.

2. The composition as claimed in claim 1 wherein said tannin is a condensed tannin.

3. The composition as claimed in claim 1 wherein the weight percent of said tannin is 20 to 80% and the weight percent of said cationic monomer is 80 to 20%.

4. The composition as claimed in claim 1 wherein the weight percent of said tannin is 30 to 50% and the weight percent of said cationic monomer is 70 to 50%.

5. A water soluble or dispersible polymer composition comprising a polymer of a tannin, a cationic monomer and at least one monomer selected from the group consisting of an anionic monomer and a nonionic monomer.

6. The composition as claimed in claim 5 wherein the weight percent of said tannin is from 10 to 80%, the weight percent of said cationic monomer is from 20 to 90%, the weight percent of said nonionic monomer is from 0 to 30% and the weight percent of said anionic monomer is from 0 to 20%, provided at least one of said nonionic monomer and anionic monomer is present and said weight percent totals 100%.

7. The composition as claimed in claim 5 wherein said tannin is a condensed tannin.

* * * * *